United States Patent
Dinu

(10) Patent No.: US 10,152,161 B2
(45) Date of Patent: Dec. 11, 2018

(54) COMPACT TOUCH SCREEN CONTROLLER HAVING MULTIPLEXED SENSE LINES

(71) Applicant: STMicroelectronics Asia Pacific Pte Ltd, Singapore (SG)

(72) Inventor: Leonard Dinu, Singapore (SG)

(73) Assignee: STMICROELECTRONICS ASIA PACIFIC PTE LTD, Singapore (SG)

(*) Notice: Subject to any disclaimer, the term of this patent is extended or adjusted under 35 U.S.C. 154(b) by 0 days.

(21) Appl. No.: 14/736,317

(22) Filed: Jun. 11, 2015

(65) Prior Publication Data

US 2016/0364058 A1 Dec. 15, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04111* (2013.01)

(58) Field of Classification Search
CPC ....... G06F 3/044; G06F 3/0416; G06F 3/0412
USPC ........................................ 345/173; 178/18.06
See application file for complete search history.

(56) References Cited

U.S. PATENT DOCUMENTS

| | | | | |
|---|---|---|---|---|
| 2005/0122785 A1* | 6/2005 | Umeda | ................... | G06F 3/044 365/187 |
| 2005/0141263 A1* | 6/2005 | Umeda | ................... | G06F 3/044 365/149 |
| 2006/0158202 A1* | 7/2006 | Umeda | ................... | G06F 3/044 324/686 |
| 2010/0321315 A1* | 12/2010 | Oda | ........................ | G06F 3/044 345/173 |
| 2011/0084924 A1* | 4/2011 | Chang | ..................... | G06F 3/044 345/173 |
| 2011/0261006 A1* | 10/2011 | Joharapurkar | .......... | G06F 3/044 345/174 |
| 2012/0056841 A1* | 3/2012 | Krenik | ................... | G06F 3/044 345/174 |

\* cited by examiner

*Primary Examiner* — Adam J Snyder
(74) *Attorney, Agent, or Firm* — Crowe & Dunlevy

(57) ABSTRACT

A touch screen controller is for a drive line emitting a periodic signal and capacitively intersecting sense lines. A selection circuit, for each of a number of portions of the periodic signal equal to a number of the sense lines, couples a first subset of the sense lines to a first output path, and couples a second subset of the sense lines to a second output path, the second subset being sense lines not included in the first subset. Processing circuitry, for each portion of the periodic signal, measures a capacitance of the first output path, measures a capacitance of the second output path, and sums the capacitance of the first output path and the capacitance of the second output path. The processing circuitry determines a capacitance between each sense line of the first and second subsets and the drive line as a function of the sums.

12 Claims, 4 Drawing Sheets

COMPACT TOUCH SCREEN CONTROLLER HAVING MULTIPLEXED SENSE LINES

TECHNICAL FIELD

This disclosure is related to the field of touch screen devices, and, more particularly, to touch screen controllers for sensing layers of such touch screen devices.

BACKGROUND

Handheld electronic devices such as smartphones, tablets, and smartwatches are popular with consumers and are sold in great numbers. The majority of these devices employ a touch sensitive display for both display of output to a user and accepting data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sensing lines. The sensing lines capacitively intersect the drive lines. In operation, a single drive line is driven with a wave, such as a square wave or sine wave. The capacitance between the sensing lines and the driven drive line is sensed at the point where they intersect. Presence of a human finger or a conductive object alters the expected capacitance at the intersection point, and by measuring the change in capacitance, a touch between the finger or object and the touch sensitive display can be detected.

These touch sensitive displays include a touch screen controller. The touch screen controller includes a separate receiver coupled to each sense line to measure the capacitance thereof. The capacitances of the sense lines can be used by processing circuitry, such as a system on chip of the electronic device, to determine contact points between human fingers and the touch sensitive display. These contact points are used as input.

Since the above described handheld electronic devices are powered by batteries, it is desirable for the life of those batteries to be as long as possible. Therefore, reducing the amount of power consumed by various components of electronic devices is commercially desirable and a technical challenge.

The above described touch screen controllers provide robust performance, but may consume more power than desired. Therefore, new designs for touch screen controllers that consume less power are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One aspect is directed to a touch screen controller for at least one drive line emitting a periodic signal and a plurality of sense lines capacitively intersecting the at least one drive line. The touch screen controller includes first and second output paths, and a selection circuit. The selection circuit is configured to, for each of a number of portions of the periodic signal equal to a number of the plurality of sense lines couple a first subset of the plurality of sense lines to the first output path, and couple a second subset of the plurality of sense lines to the second output path, the second subset being at least some sense lines not included in the first subset. The touch screen controller includes processing circuitry configured to, for each portion of the periodic signal, measure a capacitance of the first output path representing a sum of capacitances between each sense line of the first subset and the at least one drive line, measure a capacitance of the second output path representing a sum of capacitances between each sense line of the second subset and the at least one drive line, and sum the capacitance of the first output path and the capacitance of the second output path. The processing circuitry is also configured to determine a capacitance between each sense line of the first and second subsets and the at least one drive line as a function of the sums.

The selection circuit may include a switch circuit for each of the plurality of sense lines, with each selection circuit being configured to selectively couple an associated selection line to the first output path or the second output path in response to a control signal.

A number of sense lines in the first subset and a number of sense lines in the second subset may be equal. In some application, a number of sense lines in the first subset and a number of sense lines in the second subset may be unequal.

In some instances, none of the sense lines of the first subset are adjacent each other, and none of the sense lines of the second subset are adjacent each other.

The processing circuitry may determine the capacitance between each sense line of the first and second subsets and the at least one drive line by for each period, generating an equation, wherein the equation sets the sum of the capacitance of each sense line of the first and second subsets equal to the sum of the capacitance of the first output path and the second output path. A system of equations is formed by the equation generated for each iteration. The processing circuitry determines the capacitance between each sense line of the first and second subsets by solving the system of equations for the capacitance of each sense line of the first and second subsets.

Another aspect is directed to a sensing layer for a touch sensitive display. The sensing layer includes a one drive line having driving circuitry coupled thereto to cause the at least one drive line to carry a periodic signal, and a plurality of sense lines capacitively intersecting the at least one drive line. A touch screen controller includes first and second output paths. A selection circuit is configured to couple a first subset of the plurality of sense lines to the first output path during a period of time, and couple a second subset of the plurality of sense lines to the second output path during the period of time, the second subset being sense lines not included in the first subset. Processing circuitry is configured to measure a capacitance of the first output path representing a sum of capacitances between each sense line of the first subset and the at least one drive line, measure a capacitance of the second output path representing a sum of capacitances between each sense line of the second subset and the at least one drive line, and determine a capacitance between each sense line of the first and second subsets and the at least one drive line as a function of the capacitance of the first output path and the capacitance of the second output path.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
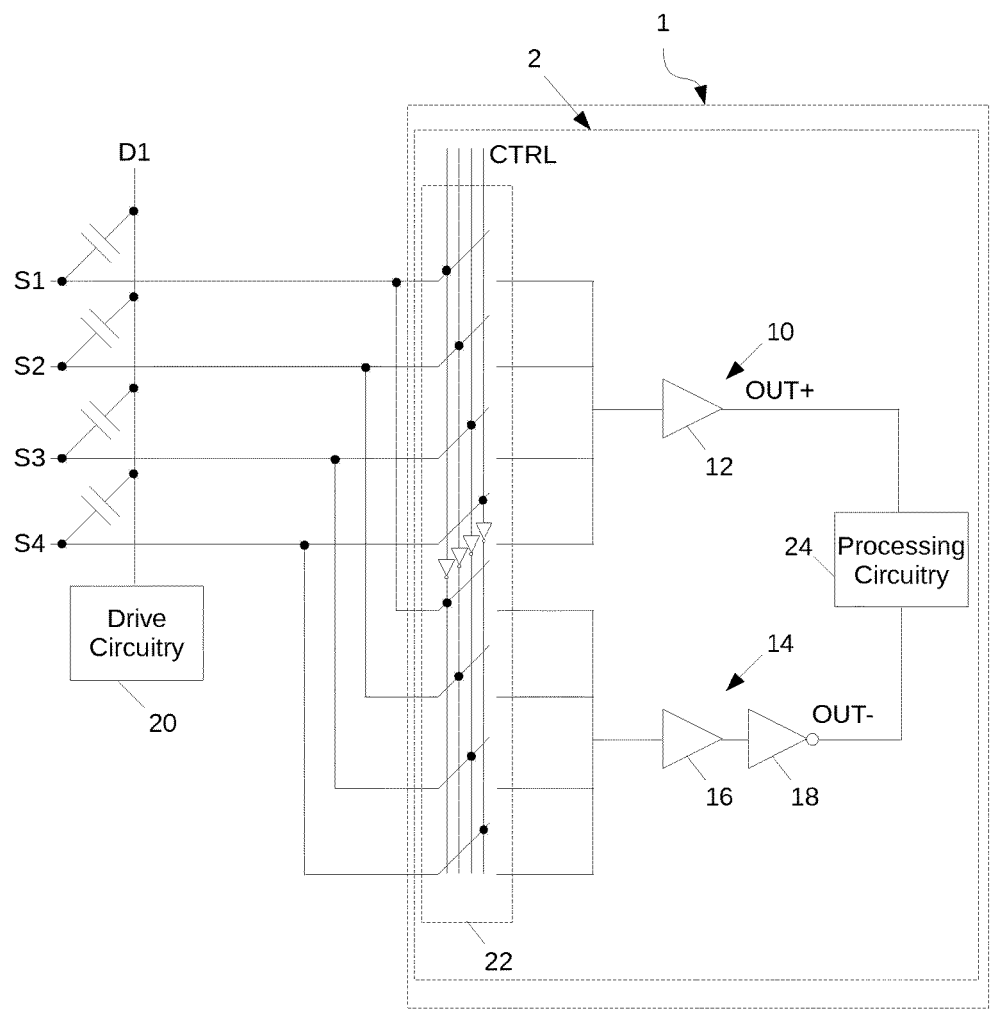
FIG. 1 illustrates a sensing layer and touch screen controller in accordance with this disclosure.

With initial reference to FIG. 1, a touch screen controller 1 for an electronic device is now described. The electronic device includes a drive line D1 that is driven by driving circuitry 20, and sense lines S1-S4 intersecting the drive line D1. At each intersection point between the drive line D1 and the sense lines S1-S4, a capacitance is formed.

The touch screen controller 1 includes receiver circuitry 2. The receiver circuitry 2 includes a selection circuit 22 switchable as a function of a control signal CTRL. The selection circuit 22 serves to multiplex the capacitances at the intersections between the sense lines S1-S4 to first and second output paths 10, 14. The first and second output paths 10, 14 are coupled to processing circuitry 24. The first output path 10 includes a buffer 12, while the second output path 14 includes a buffer 16 and an inverter 18.

In operation, the driving circuitry 20 drives the drive line D1 with a periodic signal, such as a sine wave or square wave. At each intersection point between the drive line D1 and the sense lines S1-S4, the respective sense line S1-S4 incurs a charge injection proportional to the voltage at the drive line D1 and a capacitance between the respective sense line S1-S4 and the drive line D1 at that intersection point. These capacitances vary in proximity to conductive objects, such as human fingers.

In response to the control signal CTRL which transitions once per period of the periodic signal, the selection circuit 22 couples a subset of the sense lines S1-S4 to the first output path 10, while coupling the remainder of the sense lines S1-S4 to the second output path 14. Thus, it should be noted that each sense lines S1-S4 is coupled to either the first output path 10 or the second output path 14, and not to both at any given selection instant.

The control signal CTRL changes at each period of the periodic signal such that, over a number of periods P equal to the total number N of sense lines S1-S4, N distinct combinations of sense lines S1-S4 have been coupled to the first output path 10 and the second output path 14 in aggregate, with the combinations coupled to the second output path 14 being complements of the combinations coupled to the first output path 10. The exception to these possible combinations is that there is not an instance where one or more of the sense lines S1-S4 is coupled to both the first output path 10 and the second output path 14. In one potential application, it may be advantageous for there to not be a configuration where each sense line S1-S4 is coupled to the first output path 10, and no sense line S1-S4 is coupled to the second output path 14, or vice versa. Otherwise, equal or unequal numbers of sense lines S1-S4 may be coupled to the first and second output paths 10, 14. All, some, or none of the sense lines S1-S4 of the subset may be adjacent each other, and all, some, or none of the sense lines S1-S4 of the remainder may be adjacent each other.

The control signal CTRL can be represented by a matrix. Example matrices for the illustrated embodiment include:

$$Out+ = \begin{pmatrix} 1 & 0 & 0 & 0 \\ 1 & 0 & 1 & 1 \\ 0 & 0 & 1 & 0 \\ 1 & 1 & 1 & 0 \end{pmatrix} \begin{matrix} S1 \\ S2 \\ S3 \\ S4 \end{matrix}$$

$$\begin{matrix} P1 & P2 & P3 & P4 \end{matrix}$$

and $$Out- = \begin{pmatrix} 0 & 1 & 1 & 1 \\ 0 & 1 & 0 & 0 \\ 1 & 1 & 0 & 1 \\ 0 & 0 & 0 & 1 \end{pmatrix} \begin{matrix} S1 \\ S2 \\ S3 \\ S4 \end{matrix}$$

$$\begin{matrix} P1 & P2 & P3 & P4 \end{matrix}$$

The processing circuitry 24 determines the capacitances at each intersection between the sense lines S1-S4 and the drive line D1. The processing circuitry 24 does this by, for each of the P periods, measuring the capacitance of the first output path 10. This capacitance of the first output path 10 represents a sum of the capacitances for each sense line S1-S4 of the subset thereof that is coupled to the first output path 10. The processing circuitry 24 also, for each of the P periods, measures the capacitance of the second output path 14. This capacitance of the second output path 14 represents a sum of capacitances for each sense line S1-S4 of the remainder thereof. The processing circuitry 24 then determines the capacitance for each sense line S1-S4 as a function of the capacitance of the first output path 10 and the capacitance of the second output path 14.

One way in which to determine the capacitance for each sense line S1-S4, given the capacitances of the first and second output paths 10, 14 is by adding the capacitances of the first and second output paths 10, 14 for each of the P periods. By using an orthogonal control matrix, four linearly independent equations with four unknown variables can be formed. An example orthogonal control matrix is:

$$M = \begin{pmatrix} 1 & -1 & -1 & -1 \\ 1 & -1 & 1 & 1 \\ -1 & -1 & 1 & -1 \\ 1 & 1 & 1 & -1 \end{pmatrix}$$

Applying this control matrix, the four following equations are formed:

$$C(P1) = (C1 + C2 - C3 + C4) * k$$

$$C(P2) = (-C1 - C2 - C3 + C4) * k$$

$$C(P3) = (-C1 + C2 + C3 + C4) * k$$

$$C(P4) = (-C1 + C2 - C3 - C4) * k$$

where C1 is the capacitance between S1 and D1, C2 is the capacitance between S2 and D1, C3 is the capacitance between S3 and D1, and C4 is the capacitance between S4 and D1, where k is a gain constant, and each period (P1, P2, P3, P4) corresponds to a column of M.

Due to the orthogonality of the control matrix M, the values of the capacitances are simple to calculate as:

$$C1=[C(P1)-C(P2)-C(P3)-C(P4)]/4k$$

$$C2=[C(P1)-C(P2)+C(P3)+C(P4)]/4k$$

$$C3=[-C(P1)-C(P2)+C(P3)-C(P4)]/4k$$

$$C4=[C(P1)+C(P2)+C(P3)-C(P4)]/4k$$

These results have been found to be accurate. The fact that each capacitance C1-C4 is measured four times contributes to this accuracy, and helps provide for good noise rejection since the noise gets averaged.

While the orthogonal matrix shown above is suitable as a control matrix, other control matrices are within the scope of this disclosure. For example, Walsh matrices known to those of skill in the art may be used as the control matrix, although in that case the number of sense lines S1-S4 coupled to the first and second output paths 10, 14 should be equal. In addition, for one column of the Walsh matrix, the capacitance of the second output path 14 is subtracted from the first output path 10 of being added thereto. Otherwise, operation would proceed as described above.

Suitable non-orthogonal control matrices may also be used and are within the scope of this disclosure, although it is recognized that they may result in more complex calculations for determining the capacitances C1-C4.

The advantages provided by the touch screen controller 1 described herein are readily apparent. The reduced number of receivers 2 compared to prior designs reduces power consumption, which is an ever more commercially desirable goal. In addition, the reduced number of receivers 2 provides for space savings, which ultimately can provide for more space inside an electronic device for a larger battery or space for other components.

Although four sense lines S1-S4 have been shown and the above shown calculations have been based upon four sense lines S1-S4, the setup illustrated in FIG. 1 may work with any number of sense lines, and for Y sense lines, (Y, Y) matrices will be used. Similarly, although one drive line D1 has been shown and the above shown calculations have been based upon one drive line D1, the setup illustrated in FIG. 1 may work with any number of drive lines D1.

Figure 2:
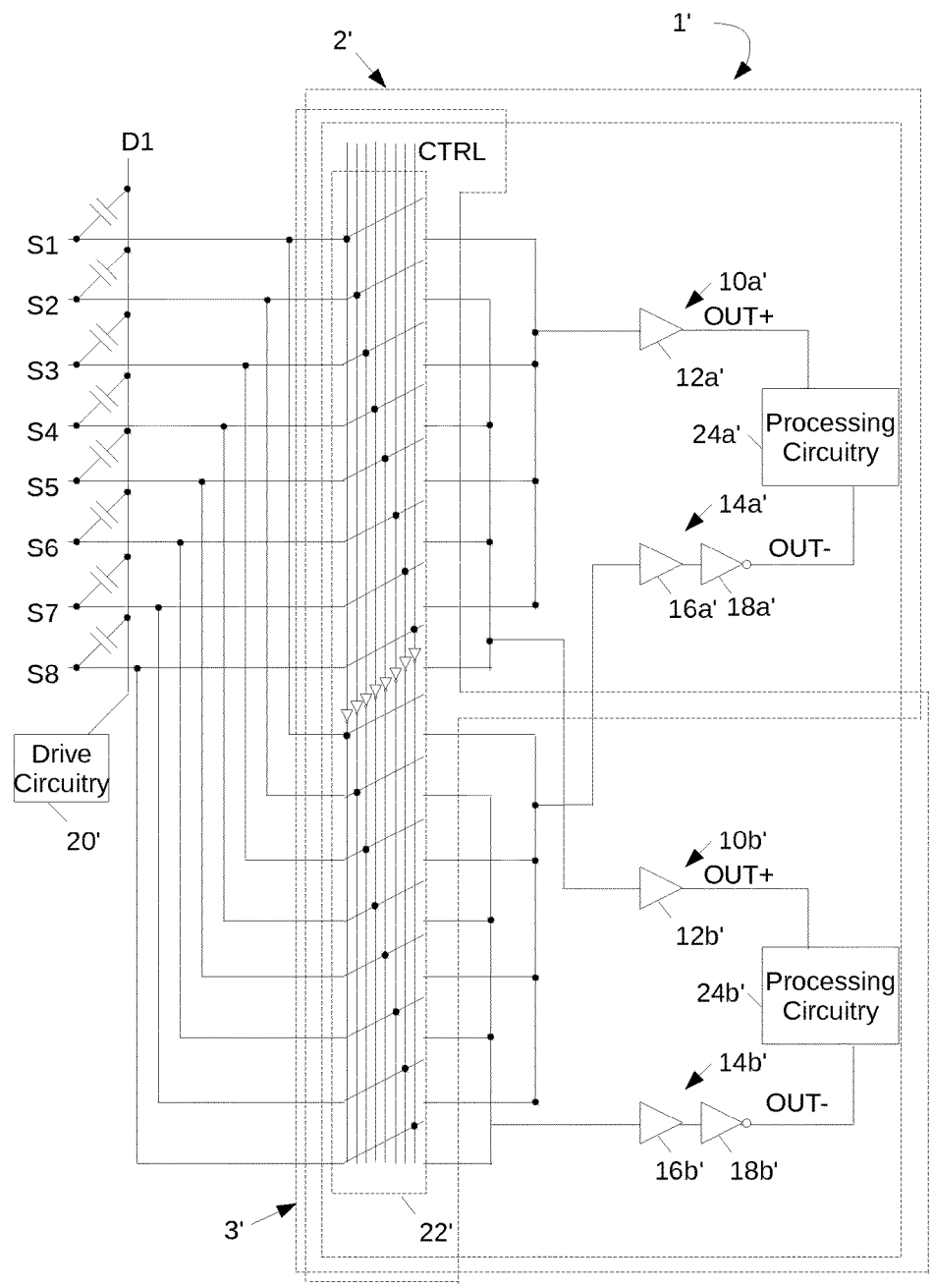
FIG. 2 illustrates another embodiment of a sensing layer and touch screen controller in accordance with this disclosure.

In addition, although the touch screen controller 1 is shown as having one receiver set 2, it should be appreciated that other receiver sets may be used as well. Referring now to FIG. 2, an example embodiment of the touch screen controller 1' in which two receiver sets 2', 3' are present is now described. In this application, there is still one drive line D1, but there are eight sense lines S1-S8. The selection circuit 22' operates for the sense lines S1-S8, and is connected to both the first receiver 2' and the second receiver 3'.

The first receiver 2' includes a first output path 10a' coupled between the output of the selection circuit 22' and the processing circuitry 24a'. The first output path 10a' includes a buffer 12a'. The first receiver 2' also includes a second output path 14a' coupled between the output of the selection circuit 22' and the processing circuit 24a'. The second output path 14a' includes a buffer 16a' and an inverter 18a'.

Similarly, the second receiver 3' includes a first output path 10b' coupled between the output of the selection circuit 22' and the processing circuitry 24b'. The first output path 10b' includes a buffer 12b'. The second receiver 3' also includes a second output path 14b' coupled between the output of the selection circuit 22' and the processing circuitry 24b'. The second output path 14b' includes a buffer 16b' and an inverter 18b'.

Nonadjacent sense lines S1-S8 are coupled to the first and second receivers 2', 3'. For example, sense lines S1, S3, S5, S7 are coupled to the first receiver 2', while sense lines S2, S4, S6, S8 are coupled to the second receiver 3'. This may be done so as to reduce the impact of external noise on results.

Operation of the touch screen controller 1' proceeds similarly to that of the touch screen controller 1 described above with reference to FIG. 1, with the selection circuit 22' multiplexing the sense lines S1-S8 to the first and second receivers 2', 3', and in turn to the first and second output paths 10a', 14a', 10b', 14b' of the first and second receivers 2', 3'. The first receiver 2' determines the capacitances of the sense lines S1-S8 coupled thereto, and the second receiver 3' determines the capacitances of the sense lines S1-S8 coupled thereto. These capacitance determinations proceed for each of the first and second receivers 2', 3' proceeds as described above.

Figure 3:
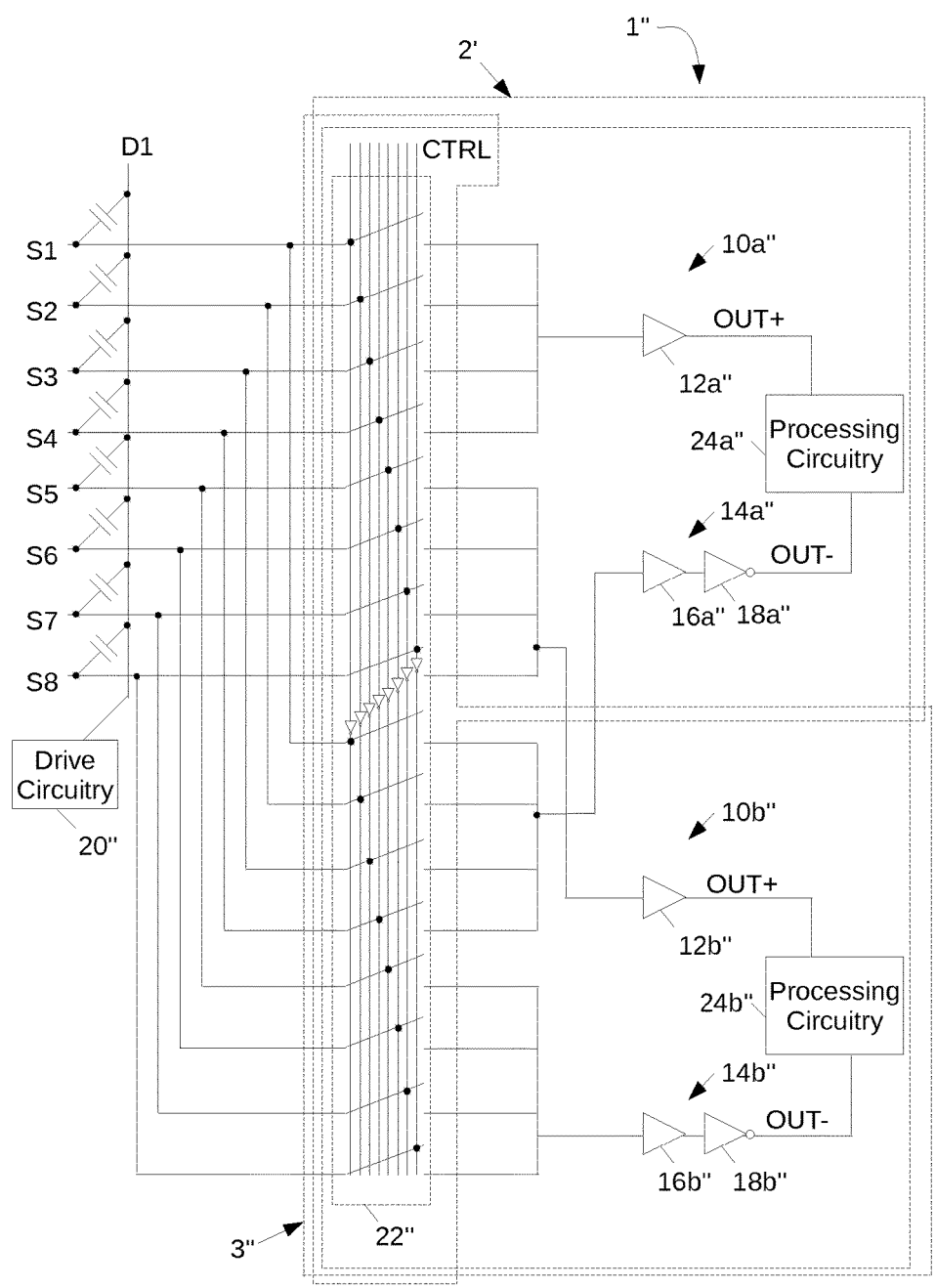
FIG. 3 illustrates a further embodiment of a sensing layer and touch screen controller in accordance with this disclosure.

The sense lines S1-S8 coupled to the first and second receivers 2', 3' need not be nonadjacent. As shown in the example embodiment of FIG. 3, sense lines S1-S4 may be coupled to the first receiver 2'', while sense lines S5-S8 may be coupled to the second receiver 3''. The setup of this embodiment of the touch screen controller 1'' is otherwise the same as described above with respect to the touch screen controller 1' of FIG. 1, as is operation. Therefore, further description need not be given.

Figure 4:
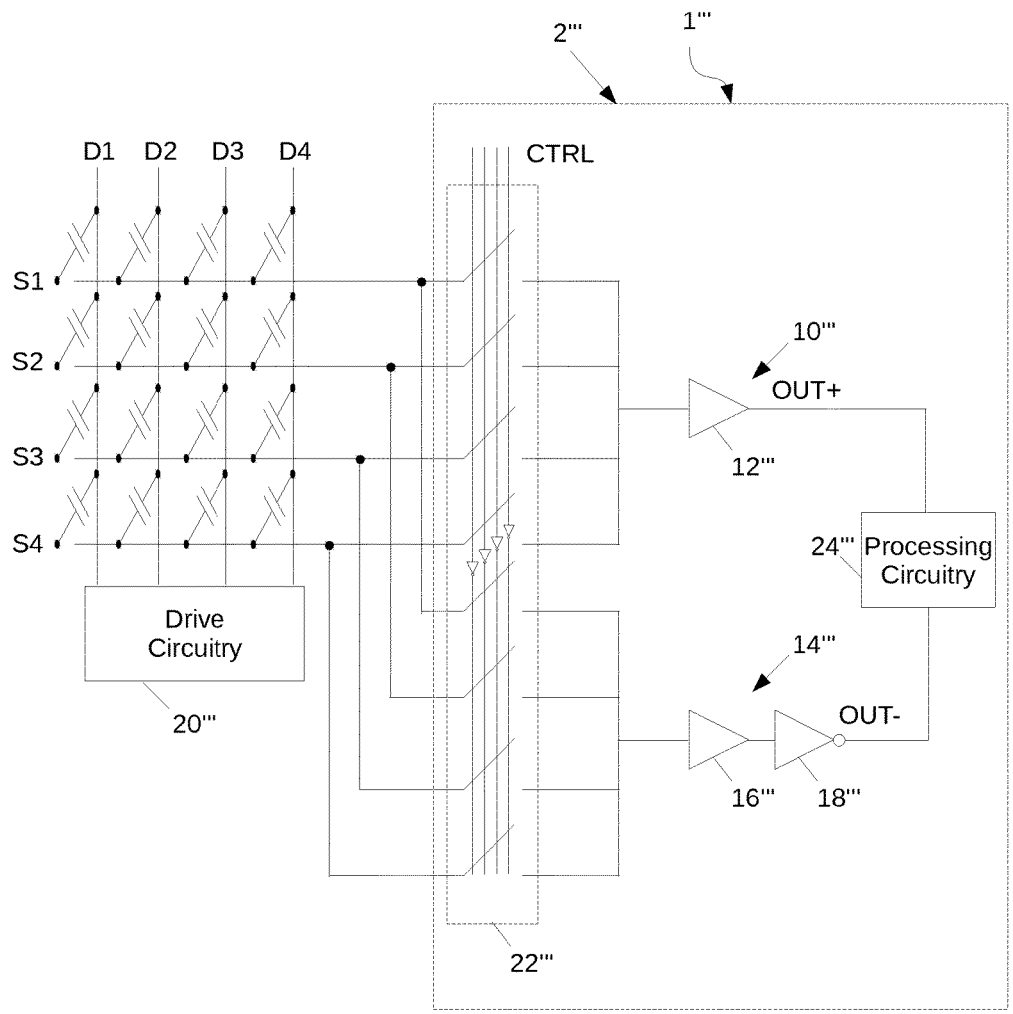
FIG. 4 illustrated an additional embodiment of a sensing layer and touch screen controller in accordance with this disclosure.

The techniques described above are equally applicable to embodiments employing "force encoding" of the drive lines. Such an application is now described with reference to FIG. 4. Here, there are four sense lines S1-S4, as well as four drive lines D1-D4. Determination of the capacitances between each sense line S1-S4 and each drive line D1-D4 is performed during four time periods T1-T4, with each time period being comprised of four sub-periods (T11, T12, T13, T14 for T1, for example). During each period, the drive lines D1-D4 are driven according to a same configuration for the duration of that entire time period. A sample matrix controlling the configuration of the drive lines D1-D4 over time periods T1-T4 is:

$$Md = \begin{pmatrix} T1 & T2 & T3 & T4 \\ -1 & 1 & 1 & 1 \\ 1 & -1 & 1 & 1 \\ 1 & 1 & -1 & 1 \\ 1 & 1 & 1 & -1 \end{pmatrix} \begin{matrix} D1 \\ D2 \\ D3 \\ D4 \end{matrix}$$

During each sub-period, in response to the control signal CTRL which transitions once per period of the periodic signal, a different subset of the sense lines S1-S4 is coupled to the first output path 10''' and a complement of that subset is coupled to that second output path 14'''. A sample matrix of the control signal CTRL over the sub-periods TX1-TX4 (with X representing the period to which the sub-periods belong) is:

$$Ms = \begin{pmatrix} TX1 & TX2 & TX3 & TX4 \\ 1 & -1 & -1 & -1 \\ 1 & -1 & 1 & 1 \\ -1 & -1 & 1 & -1 \\ 1 & 1 & 1 & -1 \end{pmatrix} \begin{matrix} S1 \\ S2 \\ S3 \\ S4 \end{matrix}$$

For each sub-period, the outputs OUT+ and OUT− are summed, and thus the capacitances between each row and each column are summed. Applying Md as the matrix controlling the configuration of the drive lines D1-D4 and Ms as the matrix controlling the control signal CTRL (where 1 and −1 denote the sense lines S1-S4 connected to the first output path 10''' and second output path 14''' respectively), the outputs for the sub-periods can therefore be calculated as:

Out $TX1$=Row1+Row2−Row3+Row4

Out $TX2$=−Row1−Row2−Row3+Row4

Out $TX3$=−Row1+Row2+Row3+Row4

Out $TX4$=−Row1+Row2−Row3−Row4

Calculation of the row values for TX1, for example, is performed as:

Row1=(Out $TX1$−Out $TX2$−Out $TX3$−Out $TX4$)/4=−$C11$+$C12$+$C13$+$C14$

Row2=(Out $TX1$−Out $TX2$+Out $TX3$+Out $TX4$)/4=−$C21$+$C22$+$C23$+$C24$

Row3=(−Out $TX1$−Out $TX2$+Out $TX3$−Out $TX4$)/4=−$C31$+$C32$+$C33$+$C34$

Row4=(Out $TX1$+Out $TX2$+Out $TX3$−Out $TX4$)/4=−$C41$+$C42$+$C40$+$C44$

Values of the rows for TX2-TX4 are calculated the same way via the application of Md and Ms. Linear equations as described above are then applied to solve for the capacitances.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A sensing layer for a touch sensitive display, comprising:
   a plurality of drive lines;
   driving circuitry configured to:
      cause a first subset of the plurality of drive lines to carry a first periodic signal during a first period;
      cause a second subset of the plurality of drive lines to carry a second periodic signal during the first period, the second subset of the plurality of drive lines being drive lines not included in the first subset thereof;
      cause a third subset of the plurality of drive lines to carry the first periodic signal during a second period;
      cause a fourth subset of the plurality of drive lines to carry the second periodic signal during the second period, the fourth subset of the plurality of drive lines being drive lines not included in the third subset thereof;
   a plurality of sense lines capacitively intersecting the plurality of drive lines;
   a touch screen controller comprising:
      first and second output paths;
      a selection circuit responsive to a control signal and configured to, for each of the first and second periods:
         couple a first subset of the plurality of sense lines to the first output path during a first sub-period;
         couple a second subset of the plurality of sense lines to the second output path during the first sub-period, the second subset being sense lines not included in the first subset;
         couple a third subset of the plurality of sense lines to the first output path during a second sub-period; and
         couple a fourth subset of the plurality of sense lines to the second output path during the second sub-period, the fourth subset being sense lines not included in the third subset;
      processing circuitry configured to, for each of the first and second periods:
         measure a capacitance of the first output path representing a sum of capacitances between each sense line of the first subset of the plurality of sense lines and each of the plurality of drive lines, during the first sub-period;
         measure a capacitance of the second output path representing a sum of capacitances between each sense line of the second subset of the plurality of sense lines and each of the plurality of drive lines, during the first sub-period;
         measure a capacitance of the first output path representing a sum of capacitances between each sense line of the third subset of the plurality of sense lines and each of the plurality of drive lines, during the second sub-period;
         measure a capacitance of the second output path representing a sum of capacitances between each sense line of the fourth subset of the plurality of sense lines and each of the plurality of drive lines, during the second sub-period; and
         determine a capacitance between each sense line and each drive line as a function of the capacitance of the first output path and the capacitance of the second output path during the first and second sub-periods.

2. The sensing layer of claim 1, wherein the selection circuit comprises a switch circuit for each of the plurality of sense lines, each selection circuit configured to selectively couple an associated selection line to the first output path or the second output path in response to a control signal.

3. The sensing layer of claim 2, wherein the control signal transitions between different commands for the selection circuit as a function of a period of the first periodic signal.

4. The sensing layer of claim 1, wherein the first output path is a non-inverting path; and wherein the second output path is an inverting path.

5. The sensing layer of claim 1, wherein a number of sense lines in the first subset and a number of sense lines in the second subset are equal.

6. The sensing layer of claim 1, wherein a number of sense lines in the first subset and a number of sense lines in the second subset are unequal.

7. The sensing layer of claim 1, wherein none of the sense lines of the first subset are adjacent each other; and wherein none of the sense lines of the second subset are adjacent each other.

8. The sensing layer of claim 1, wherein none of the sense lines of the first subset are adjacent each other; wherein none of the sense lines of the second subset are adjacent each other; wherein none of the sense lines of the third subset are adjacent each other; and wherein none of the sense lines of the fourth subset are adjacent each other.

9. The sensing layer of claim 1, wherein the processing circuitry determines the capacitance between each sense line of the first and second subsets and each of the plurality of drive lines by:
   for a number of times equal to a number of the plurality of sense lines, sum the capacitance of the first output path and the second output path, each iteration occurring during a successive period of the first periodic signal;

populate an equation, wherein the equation sets the sum of the capacitance of each sense line of the first and second subsets equal to the sum of the capacitance of the first output path and the second output path;

wherein a system of equations is formed by the equation populated for each iteration; solve the system of equations for the capacitance of each sense line of the first and second subsets.

10. A touch screen controller for a plurality of drive lines and a plurality of sense lines capacitively intersecting the plurality of drive lines, the touch screen controller, comprising:

a drive circuit responsive to a drive control signal and configured to drive different ones of the plurality of drive lines during different periods, each period being subdivided into a plurality of sub-periods;

first and second output paths;

a selection circuit responsive to a control signal configured to, for each of the periods:
couple different ones of the plurality of sense lines to the first output path during each of the plurality of sub-periods;
couple the different ones of the plurality of sense lines to the second output path during each of the plurality of sub-periods;

processing circuitry configured to:
measure a capacitance of the first output path representing a sum of capacitances between each of the plurality of sense lines that is coupled to the first output path and each of the plurality of drive lines, during each of the plurality of sub-periods, and
measure a capacitance of the second output path representing a sum of capacitances between each of the plurality of sense lines that is coupled to the second output path and each of the plurality of drive lines, during each of the plurality of sub-periods;
determine a capacitance between each of the plurality of sense lines and each of the plurality of drive lines during each of the periods as a function of the capacitances of the first and second output paths during each of the plurality of sub-periods.

11. The touch screen controller of claim 10, wherein the selection circuit comprises a switch circuit for each of the plurality of sense lines, each selection circuit configured to selectively couple an associated selection line to the first output path or the second output path in response to the control signal.

12. The touch screen controller of claim 10, wherein the processing circuitry determines the capacitance between each of the plurality of sense lines and each of the plurality of drive lines by for each period, populating an equation, wherein the equation sets the sum of the capacitance of each sense line equal to the sum of the capacitance of the first output path and the second output path; wherein a system of equations is formed by the equation populated for each iteration; and wherein the processing circuitry determines the capacitance between each sense line by solving the system of equations for the capacitance of each sense line.

* * * * *

UNITED STATES PATENT AND TRADEMARK OFFICE
CERTIFICATE OF CORRECTION

| | |
|---|---|
| PATENT NO. | : 10,152,161 B2 |
| APPLICATION NO. | : 14/736317 |
| DATED | : December 11, 2018 |
| INVENTOR(S) | : Leonard Dinu |

It is certified that error appears in the above-identified patent and that said Letters Patent is hereby corrected as shown below:

In the Specification

At Column 5, Line 23, please replace the phrase [[ output path 10 of being added thereto. ]] with the phrase -- output path 10 instead of being added thereto. --.

At Column 7, Line 25, please replace the equation term [[ C40 ]] with -- C43 --.

Signed and Sealed this
Twenty-eighth Day of May, 2019

Andrei Iancu
*Director of the United States Patent and Trademark Office*